July 13, 1943.   E. E. HIGGINBOTHAM   2,324,159
BALED HAY SEPARATOR
Filed Jan. 2, 1942   3 Sheets-Sheet 1

INVENTOR
E.E.Higginbotham
BY
ATTYS

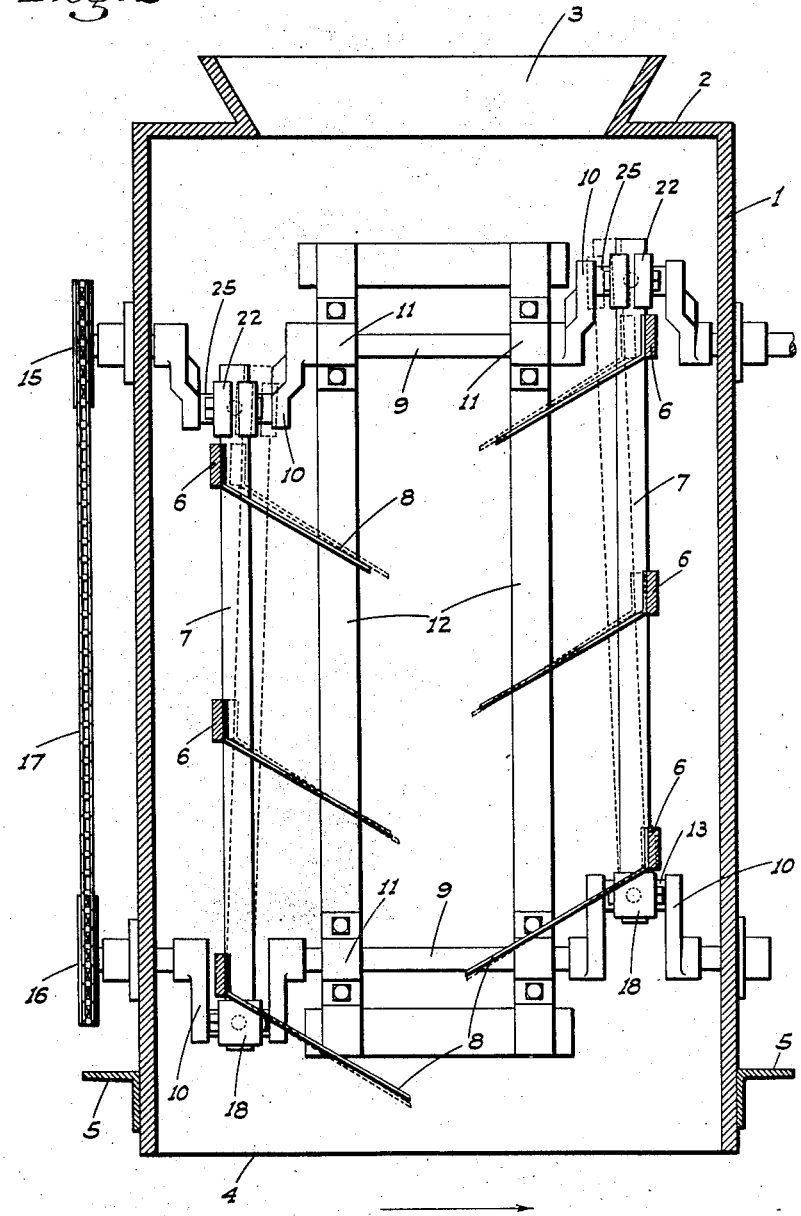

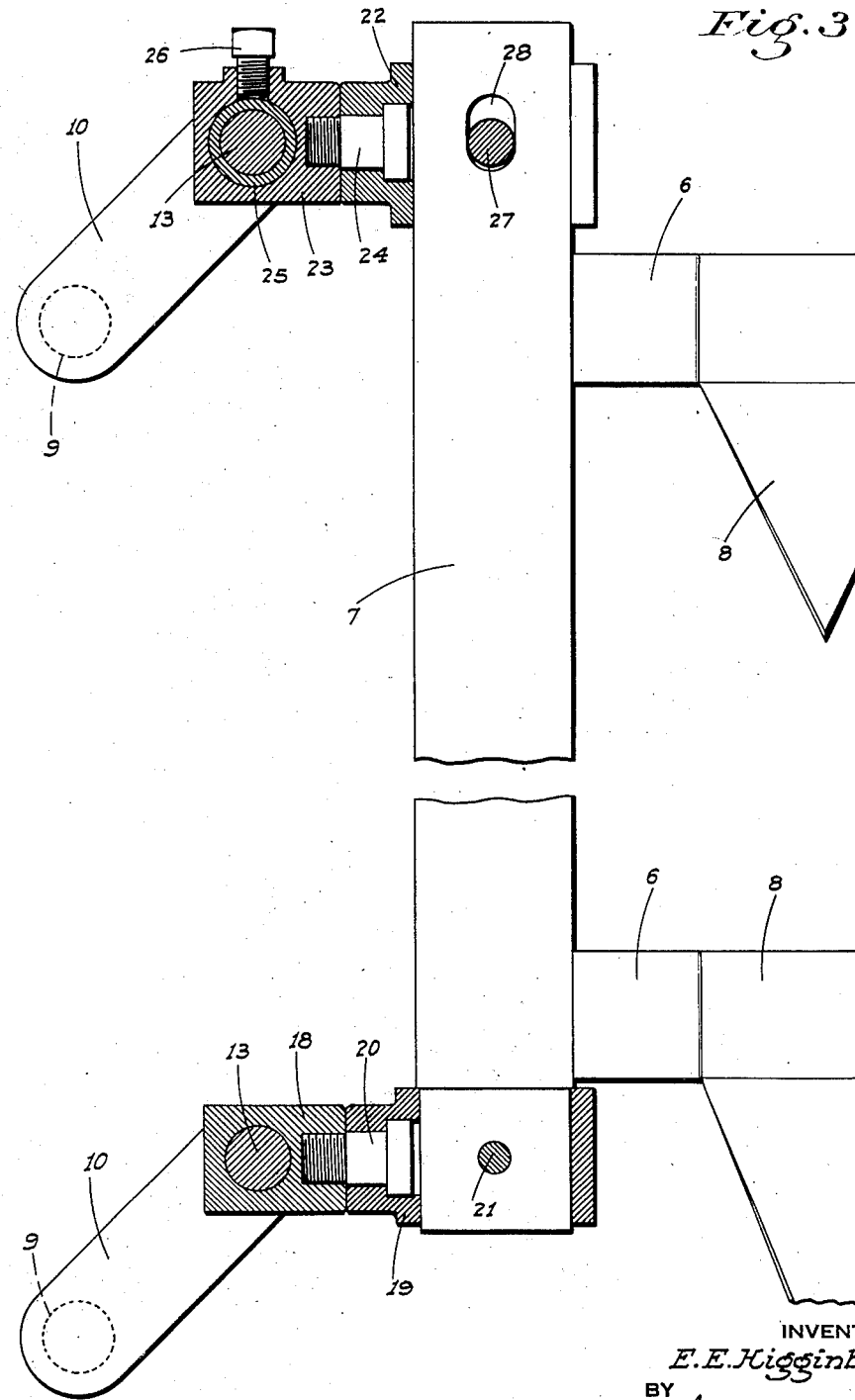

Patented July 13, 1943

2,324,159

UNITED STATES PATENT OFFICE 2,324,159

BALED HAY SEPARATOR

Eugene E. Higginbotham, Escalon, Calif.

Application January 2, 1942, Serial No. 425,485

9 Claims. (Cl. 146—160)

This invention relates in general to improved apparatus for preparing feed for livestock, and in particular the invention is directed to a baled hay separator.

Due to its relatively great density caused by compression, baled hay must be separated or loosened before it can be successfully run through a feed mill for reduction by chopping or grinding into comminuted feed. At present, it is the practice to manually break the bale of hay into chunks, which are then fed into the feed mill, but this practice is not satisfactory as the chunks tend to choke or overload the mill and consequently impair proper and effective operation thereof.

It is therefore the principal object of the present invention to provide power driven apparatus which is operative to thoroughly break up or shred chunks of baled hay preparatory to delivery of the hay to the feed mill for grinding; the device including a plurality of shredding teeth arranged in unique assembly.

A further object of this invention is to provide a baled hay separator which includes opposed banks of inwardly-projecting, downwardly-sloping shredding teeth, said banks of teeth being mounted for reciprocation in a vertical plane and in opposite directions; the teeth of each bank moving in such plane through a circular path in a direction opposite to the path of the teeth of the other bank.

An additional object of this invention is to provide a baled hay separator which includes opposed vertical banks of inwardly projecting teeth mounted for reciprocation in a vertical plane in opposite directions; the banks of teeth converging from top to bottom, and said banks being mounted for adjustment to vary the angle of convergence therebetween according to the degree of fineness of shredding desired, or the general nature of the material being handled.

A further object of the invention is to produce a simple and inexpensive device and yet one which will be exceedingly effective for the purpose for which it is designed.

These objects I accomplish by means of such structure and relative arrangement of parts as will fully appear by a perusal of the following specifications and claims.

In the drawings similar characters of reference indicate corresponding parts in the several views:

Figure 2 is a cross section on line 2—2 of Fig. 1.

Figure 3 is an enlarged fragmentary section on line 3—3 of Fig. 1.

Figure 1:
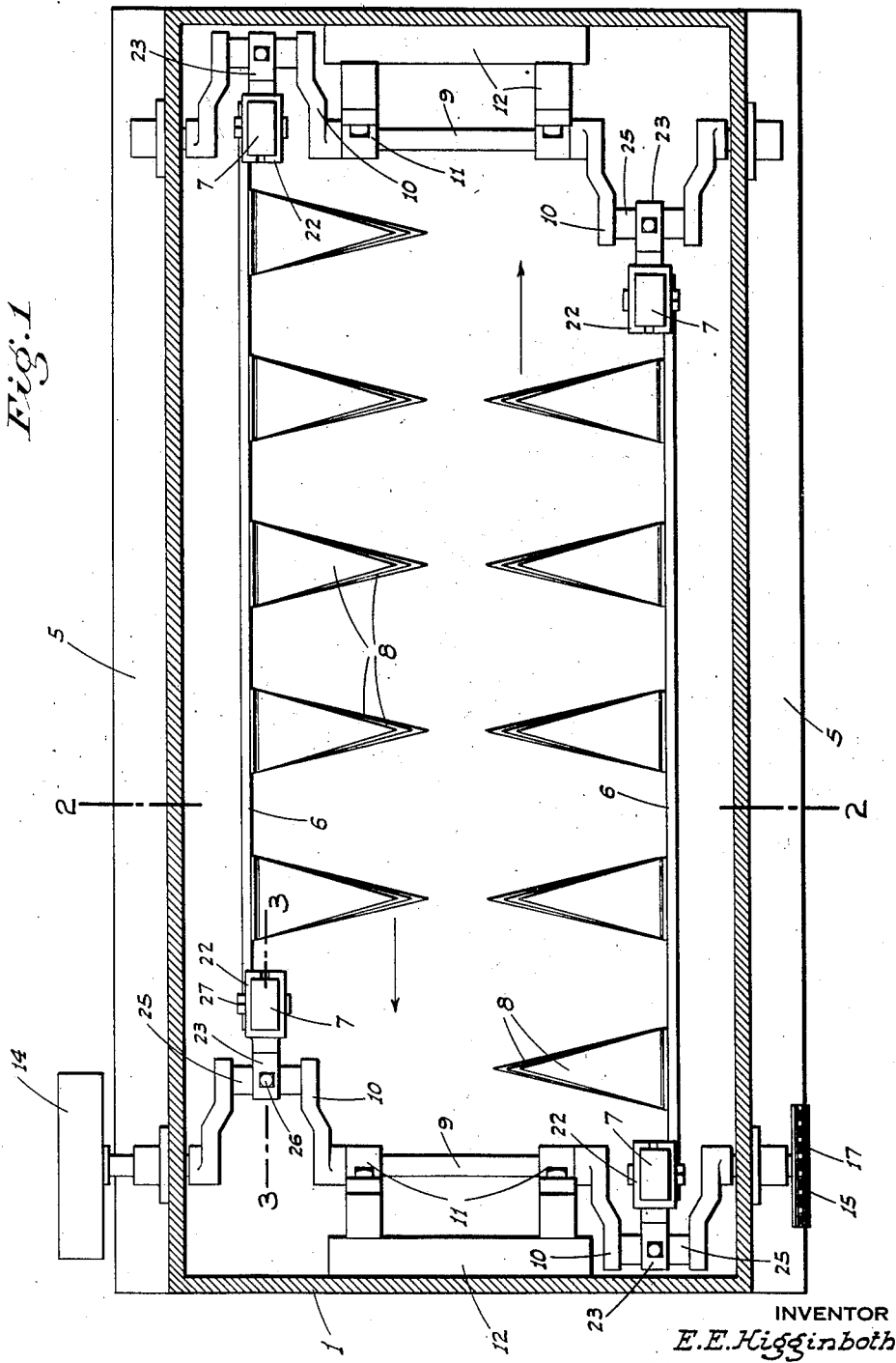
Figure 1 is a plan view of the apparatus; the housing being in section to expose said apparatus.

Referring now more particularly to the characters of reference on the drawings, my improved baled hay separator comprises an upstanding, horizontally elongated housing 1, having a top 2 through which opens a substantially full-length hopper 3; the housing 1 being open at the bottom 4 and suitably supported by means here shown as angle beams 5.

A pair of vertical, horizontally elongated teeth supporting frames are disposed in substantial transversely spaced relation within the housing; each of such frames including a plurality of evenly and vertically spaced horizontal bars 6 connected together at the ends by vertical end posts 7, such posts at the ends extending a short distance beyond the uppermost and lowermost ones of bars 6.

A plurality of symmetrically and longitudinally spaced, flat, blunt-edged teeth 8 of triangular configuration in plan are secured at their base in rows on bars 6 and project inwardly at a downward slope. The teeth 8 which project inwardly from one frame terminate at their inner end or point short of the corresponding end of the teeth which are mounted on the other frame. It will be seen that the teeth 8 and the supporting frames therefor form what may be termed "banks," and these banks of teeth are disposed in converging relation from top to bottom, as clearly shown in Fig. 2, whereby the distance between the points of the teeth projecting from opposed banks becomes lesser from top to bottom of the apparatus.

Beyond the ends of the teeth supporting frames there is mounted at each end of the housing a vertically spaced pair of crankshafts 9, each crankshaft having a pair of spaced cranks 10; the crankshafts being supported intermediate the cranks by journals 11 carried on suitable framing 12 fixed in connection with the ends of housing 1. The end posts 7 of the frames, at their upper and lower ends, are connected with the crank pins 13 by means turnable thereon, and which means will hereafter be described in detail.

The cranks which connect the frames project in the same direction, but the cranks of the opposite frames are diametrally opposed to each other whereby with rotation of the crankshafts the banks of teeth reciprocate in a vertical plane in opposite directions; the teeth of each bank describing a circular path.

At their ends, the crankshafts 9 project through and are journaled in connection with the sides of housing 1; one of said crankshafts 9 being fitted with a drive pulley 14 exteriorally of the housiing. On the opposite side of the housing, the upper and lower projecting ends of the crankshafts 9 are fitted with sprockets 15 and 16 respectively, connected together by an endless chain 17.

The end posts 7 are connected with corresponding crank pins 13 of cranks 10 in such manner as to permit of lateral adjustment of the teeth frames or banks laterally and about a pivot point at the lower end of the corresponding posts, such means in the present embodiment comprising the following for each post:

A block 18 is turnably mounted on the crank pin 13 of the corresponding lower crank 10, and a socket head 19 projects radially from such block. The socket head 19 is secured to the block 18 by a headed connecting spindle 20 which permits of rotative adjustment of socket head 19 into which the lower end of end post 7 seats; the lower end of the post being secured in the socket head by a cross bolt 21.

At the upper end, each end post 7 projects through another socket head 22 which is connected radially to another block 23 by means of a headed connecting spindle 24; the block 23 and spindle 24 being similar to block 18 and spindle 20, with the exception that block 23 is shorter than crank pin 13 of the corresponding upper crank 10, and is slidable on a sleeve 25 through which the crank pin turnably engages said pin throughout its length, whereby to permit of adjustment of block 23 along said pin.

It will be seen that with such adjustment, the end posts 7 may be swung laterally about their lower end whereby to alter the angle of convergence between the banks of blades. A set screw 26 locks sleeve 25 and block 23 in any selected position of adjustment, and a cross bolt 27 secures the upper end of post 7 in socket 22; this socket being of the split type and the opening 28 in the upper end of post 7 for crossbolt 27 being elongated to permit of relative movement of said end of the post in head 22 when the post is adjusted laterally.

Operation

In operation, the drive pulley 14 is driven in any suitable manner and with rotation of such pulley and the crankshafts 9, the frames and supported teeth reciprocate in opposite directions, as previously described; each tooth—with reciprocation of the frame—moving through a circular path. Chunks of baled hay are fed through the hopper 3 and fall between the reciprocating banks of blunt-edged teeth, whereupon such chunks are thoroughly agitated and separated into a shredded condition; the shredded hay dropping through the open bottom 4 of the housing onto a suitable conveyor C which delivers to the feed mill.

While the present structure is intended for separating chunks of baled hay, it is possible in a large installation that the apparatus would be constructed on such scale that a whole bale of hay could be separated without the necessity of breaking the bale into chunks before introducing the same into the apparatus.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A baled hay separator comprising upstanding transversely spaced frames, means to feed hay between the frames from above the same, means mounting said frames for substantially parallel reciprocating movement, and a row of teeth projecting inwardly from each of said frames, said teeth extending from the frames at a downward slope whereby the hay resting on the teeth will tend to move downward and toward the outer end of the teeth.

2. A baled hay separator comprising upstanding transversely spaced frames, means to feed hay between the frames from above the same, means mounting said frames for substantially parallel reciprocating movement in substantially vertical planes, and a plurality of substantially horizontal rows of teeth, relatively wide at their base projecting inwardly from each of said frames in vertically spaced relation, the teeth of each row being disposed at a downward slope.

3. A baled hay separator comprising transversely spaced frames, means to feed hay between the frames from above the same, said frames including end posts, vertically spaced transversely extending crankshafts beyond the ends of the frames, each crankshaft including spaced cranks, means to rotate said crankshafts, means mounting said posts adjacent their upper and lower ends in turnable connection with the corresponding cranks of said crankshafts, and teeth projecting inwardly from said frames; the cranks correspondingly connected with one frame extending in diametrally opposed relation to the cranks connected with the other frame, whereby with rotation of the crankshafts the teeth on said frames define circular paths but move in opposite directions; the teeth being disposed in vertically spaced rows converging from top to bottom and the mounting means including means to permit of lateral adjustment of said frames at one end whereby to alter the angle of convergence of the teeth.

4. A baled hay separator comprising upstanding transversely spaced frames, means to feed hay between the frames from above the same, teeth mounted on and projecting inwardly from said frames, vertically spaced transverse crankshafts beyond the ends of the frames, each crankshaft including spaced cranks, means to rotate said crankshafts, and connector units turnably mounted on the crank pins and projecting radially therefrom, said units being connected at their outer ends in rigid relation on the frames and supporting the latter for reciprocation with the cranks; the uppermost connector units being adjustable along corresponding crank pins, and the lowermost connector units being arranged to permit of lateral adjustment of the frames about said lowermost units as an axis.

5. A baled hay separator comprising substantially vertical transversely spaced frames, means to feed hay between the frames from above the same, means to reciprocate one frame through a circular path in a substantially vertical plane and vertically spaced, substantially horizontal rows of teeth mounted on and projecting inwardly from the frames; each tooth being substantially triangular in form with its base end adjacent the frame and disposed in a substantially horizontal plane.

6. A baled hay separator comprising substantially vertical transversely spaced frames, means to feed hay between the frames from above the same, means to reciprocate one frame through a circular path in a substantially vertical plane and plate-like teeth, relatively wide at their base, mounted on and projecting inwardly from the frames in spaced relation along the same and being disposed with their bases substantially horizontal.

7. A baled hay separator comprising upstanding transversely spaced frames, means to feed hay between the frames from above the same, a plurality of substantially horizontal downwardly sloping rows of teeth projecting inwardly from each frame in vertically spaced relation, means mounting one frame for reciprocating movement in a circular path in a substantially vertical plane lengthwise of the rows of teeth and means to reciprocate said one frame.

8. A baled hay separator comprising upstanding transversely spaced frames, means to feed hay between the frames from above the same, a plurality of substantially horizontal downwardly sloping rows of teeth projecting inwardly from each frame in vertically spaced relation, means mounting the frames for substantially parallel reciprocating movement in circular paths and in substantially vertical planes lengthwise of the rows of teeth, and means to reciprocate the frames in opposite directions.

9. A baled hay separator comprising upstanding transversely spaced frames, means to feed hay between the frames from above the same, a plurality of teeth mounted on and projecting laterally inward from the frames and toward each other and means to reciprocate the frames in circular paths and in substantially parallel vertical planes at substantially right angles to the direction of projection of the teeth.

EUGENE E. HIGGINBOTHAM.